(12) United States Patent
Oh et al.

(10) Patent No.: US 7,574,086 B2
(45) Date of Patent: Aug. 11, 2009

(54) INSTALLATION METHOD OF OPTICAL FIBER COMPOSITE ELECTRIC POWER CABLE AND CABLE STRUCTURE THEREFOR

(75) Inventors: Duk-Jin Oh, Gyeonggi-do (KR); Jong-Cheol Kim, Gyeonggi-do (KR)

(73) Assignee: LS Cable, Ltd., Anyang (KR)

( * ) Notice: Subject to any disclaimer, the term of this patent is extended or adjusted under 35 U.S.C. 154(b) by 350 days.

(21) Appl. No.: 10/593,166

(22) PCT Filed: Jun. 30, 2005

(86) PCT No.: PCT/KR2005/002078

§ 371 (c)(1),
(2), (4) Date: Sep. 15, 2006

(87) PCT Pub. No.: WO2006/043744

PCT Pub. Date: Apr. 27, 2006

(65) Prior Publication Data

US 2008/0247715 A1      Oct. 9, 2008

(30) Foreign Application Priority Data

Sep. 10, 2004   (KR) .................. 10-2004-0072771

(51) Int. Cl.
*G02B 6/44* (2006.01)
*H01B 11/22* (2006.01)
(52) U.S. Cl. ................. 385/101; 385/102; 385/109; 385/113; 174/113 AS
(58) Field of Classification Search ......... 385/100–109, 385/147, 110–113; 174/113
See application file for complete search history.

(56) References Cited

U.S. PATENT DOCUMENTS

| | | | |
|---|---|---|---|
| 5,046,815 A  * | 9/1991 | Cain et al. | 385/101 |
| 5,897,103 A | 4/1999 | Griffioen | |
| 6,049,647 A | 4/2000 | Register | |
| 6,101,304 A  * | 8/2000 | Quistorff et al. | 385/109 |
| 7,027,697 B2 * | 4/2006 | Tatarka et al. | 385/110 |
| 2005/0199415 A1* | 9/2005 | Glew | 174/113 C |

FOREIGN PATENT DOCUMENTS

KR      20-19954685      2/1995

OTHER PUBLICATIONS

Haag, et al. New Genration of Self Supporting Optical Fibre Aerial Cables, International Wire and Cable Symposium, 1989, pp. 575-582.*

* cited by examiner

*Primary Examiner*—Brian M. Healy
*Assistant Examiner*—Guy G Anderson
(74) *Attorney, Agent, or Firm*—Jones Day

(57) ABSTRACT

Disclosed is installation of an optical fiber composite electric power cable. An installation method of an optical fiber composite electric power cable includes installing an electric power cable including a conductor and an air-blown installation tube therein at an installation region; connecting tubes of adjacent electric power cables to each other, in an electric power cable connection box; and installing an optical fiber unit into the connected tubes by air pressure. Also, a cable structure used for installing the optical fiber composite electric power cable includes a conductor for electric power transmission; an insulator surrounding the conductor; an air-blown installation tube provided outside of the insulator; and a corrosion-protective layer provided to an outermost layer of the cable.

4 Claims, 2 Drawing Sheets

[Fig. 1]
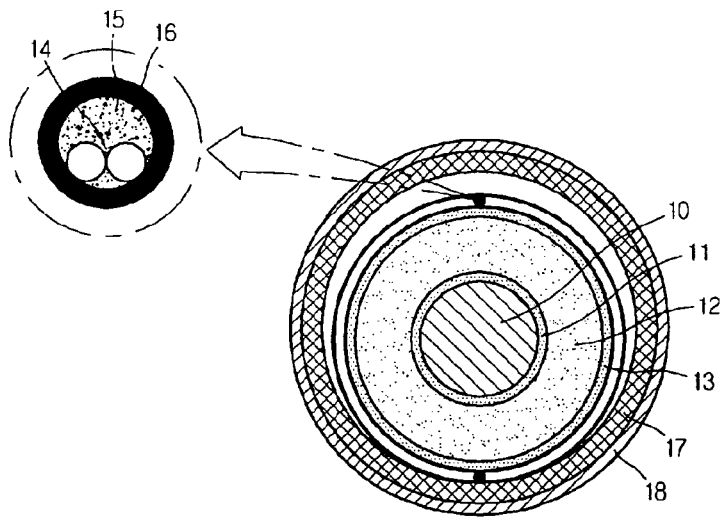
[Fig. 2]
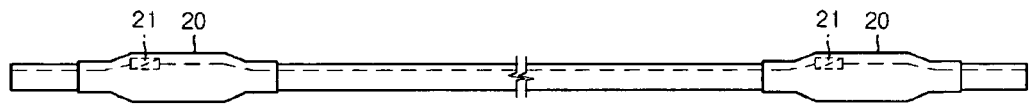
[Fig. 3]
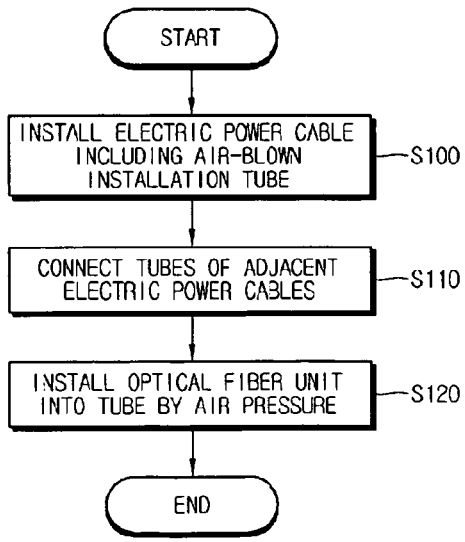

[Fig. 4]
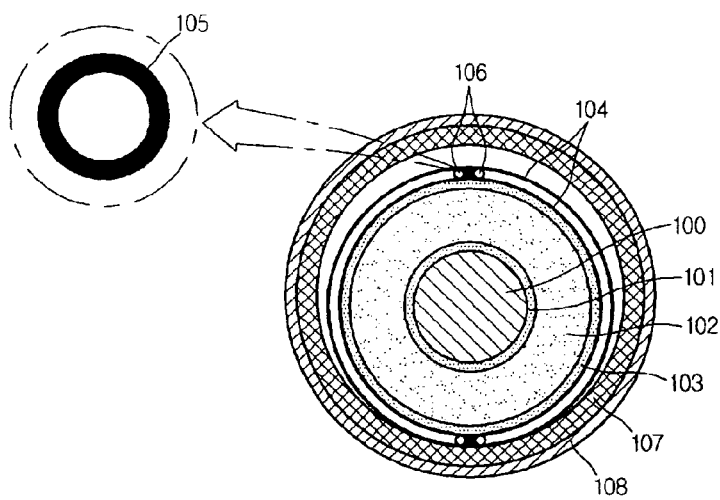
[Fig. 5]
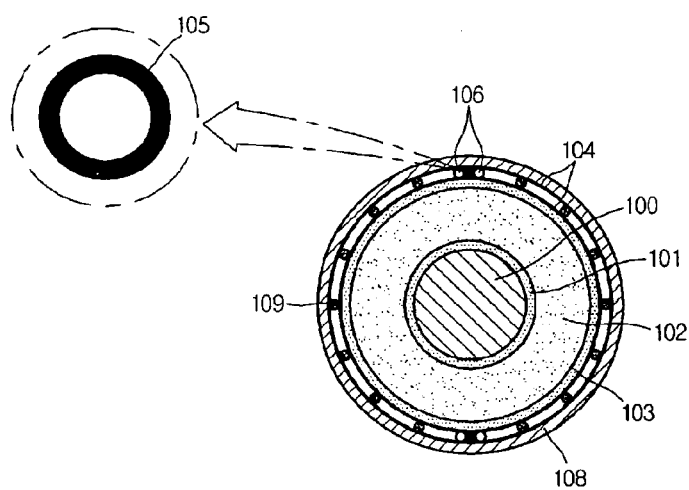
[Fig. 6]
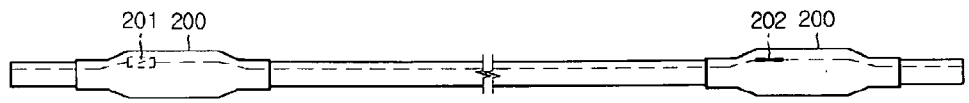

INSTALLATION METHOD OF OPTICAL FIBER COMPOSITE ELECTRIC POWER CABLE AND CABLE STRUCTURE THEREFOR

TECHNICAL FIELD

The present invention relates installation of an optical fiber composite electric power cable, and more particularly to an installation method of an optical fiber composite electric power cable capable of increasing a distance for installation without connection between optical fibers and a cable structure for the installation method.

BACKGROUND ART

An optical fiber composite electric power cable is a composite cable where an optical fiber is included in an electric power cable. The optical fiber composite electric power cable is widely used under installation environments that require monitoring of the operation of electricity, since temperature distribution of the cable may be detected using optical fibers.

Generally, the optical fiber composite electric power cable includes a conductor 10 provided at the center of the cable as shown in FIG. 1, and an inner semiconductive layer 11, an isolative layer 12, an outer semiconductive layer 13, a shielding layer 17 and a corrosion-protective layer 18 are subsequently provided around the conductor 10. In particular, adjacent to the shielding layer 17, a filling material 15 such as jelly compound and silicon oil are filled around the shielding layer 17, and an optical fiber unit 14 surrounded by a protective tube 16 is also arranged thereto. More specifically, Japanese Laid-open Publication No. 1990-144810 discloses an optical fiber composite electric power cable in which an optical fiber is arranged to the shielding layer 17 or the corrosion-protective layer 18, and Japanese Laid-open Publication Nos. 1994-148001, 1994-181013, 1994-181014 and 1994-181015 disclose an electric power cable in which an optical fiber is arranged in a part of the shielding layer 17 in a length direction and a method for measuring temperature distribution. In addition, U.S. Pat. No. 4,867,527 discloses an optical fiber composite electric power cable provided with an optical fiber out of the shielding layer 17 of the electric power cable and in which the optical fiber protective layer 16 is inserted.

However, when installing the conventional optical fiber composite electric power cable as mentioned above, an optical fiber connection box should be added in a limited space of an electric power cable connection box, which makes the installation work difficult. In addition, since such an optical fiber connection box 21 should be provided to each electric power cable connection box 20, which is installed in every 300 m region as shown in FIG. 2, optical loss is very significant.

Meanwhile, it is also possible to draw an optical fiber out of the electric power cable connection box 20 and then configure the optical fiber connection box separately in order to ensure a space for the optical fiber connection box, but this may make the electric power cable connection box 20 more complicated.

DISCLOSURE OF INVENTION

Technical Problem

The present invention is designed in consideration of the above problems, and therefore it is an object of the invention to provide a method for installing an optical fiber composite electric power cable using air blown installation, and a cable structure for the method.

Technical Solution

In order to accomplish the above object, the present invention provides an installation method of an optical fiber composite electric power cable, which includes installing an electric power cable including a conductor and an air-blown installation tube therein at an installation region; connecting tubes of adjacent electric power cables to each other, in an electric power cable connection box; and installing an optical fiber unit into the connected tubes by air pressure.

Preferably, the air-blown installation tube has a spirally wound structure along a length direction of the electric power cable.

In another aspect of the invention, there is also provided a cable structure used for installing an optical fiber composite electric power cable, which includes a conductor for electric power transmission; an insulator surrounding the conductor; an air-blown installation tube provided outside of the insulator; and a corrosion-protective layer provided to an outermost layer of the cable.

Preferably, the air-blown installation tube is spirally wound along a length direction of the electric power cable.

Additionally, tube protecting bodies may be further provided at both sides of the air-blown installation tube.

Preferably, the tube protecting bodies are made of material having lower strength than the air-blown installation tube.

Additionally, the cable structure of the present invention may further include a wire shield disposed at regular intervals in the same layer as the air-blown installation tube.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a sectional view showing a conventional optical fiber composite electric power cable;

FIG. 2 is a perspective view showing an installed state of the conventional optical fiber composite electric power cable;

FIG. 3 is a flowchart illustrating how a method for installation an optical fiber composite electric power cable according to a preferred embodiment of the present invention is executed;

FIG. 4 is a sectional view showing a cable structure for installation of the optical fiber composite electric power cable according to the present invention;

FIG. 5 is a sectional view showing a modification of FIG. 4; and

FIG. 6 is a perspective view showing an example of the optical fiber composite electric power cable installed according to the present invention.

BEST MODE FOR CARRYING OUT THE INVENTION

The present invention will be described in detail referring to the drawings. The terms used should not be construed as limited to general and dictionary meanings but based on the meanings and concepts of the invention on the basis of the principle that the inventor is allowed to define terms appropriate for the best explanation. Therefore, the description herein the scope of the invention be understood that other and modifications could be made thereto without departing from the spirit and scope of the invention.

FIG. 3 shows the procedures for executing a method of installing an optical fiber composite electric power cable according to a preferred embodiment of the present invention.

Referring to FIG. 3, at first, an electric power cable is installed in an installation region in advance (S100). At this time, the electric power cable includes a conductor and at least one air-blown installation tube that preferably has a spirally wound structure in a length direction of the cable.

Next, in an electric power cable connection box, air-blown installation tubes of adjacent electric power cables are connected to each other (S110), then completing preparation of the installation.

After the air-blown installation tubes are connected to each other, an optical fiber unit is inserted into the air-blown installation tubes by air pressure, and then the optical fiber unit is longitudinally inserted and installed along a length direction of the electric power cable (S120).

FIG. 4 shows a cable structure provided for executing the above installation method according to the preferred embodiment of the present invention.

Referring to FIG. 4, the cable structure of the present invention includes a conductor 100 for electric power transmission, an insulator 102 surrounding the conductor 100, at least one air-blown installation tube 105 provided outside of the insulator 102, and a shielding layer 107 and a corrosion-protective layer 108 provided out of the air-blown installation tube 105.

The conductor 100 used for electric power transmission is preferably provided at the center of the cable, but it may be installed at various positions as required.

Preferably, an inner semiconductive layer 101 is formed around the conductor 100 so as to relieve an electric field on the surface of the conductor, and an outer side of the inner semiconductive layer 101 is insulated by means of the insulator 102.

In addition, an outer semiconductive layer 103 is provided on the outer side of the insulator 102 for the purpose of relief of electric field and protection, and the air-blown installation tube 105 surrounded by a binding tape layer 104 is disposed on an outer side of the outer semiconductive layer 103.

The air-blown installation tube 105 is made of lubricant material for smooth installation of an optical fiber unit. Here, a point where the air-blown installation tube 105 is positioned is not limited to that shown in the drawings, but it may be variously changed.

The air-blown installation tube 105 preferably has a spirally wound structure along a length direction of the cable so as to keep a shape of the tube itself and improve installation characteristics of the optical fiber unit.

Additionally, tube protecting bodies 106 are arranged at both sides of the air-blown installation tube 105 to be in contact therewith so as to protect the tube from external force or prevent damage of the insulator 102. At this time, in order to prevent the air-blown installation tube 105 from being damaged by the tube protecting bodies 106, the tube protecting bodies 106 preferably have a wire structure made of paper or plastic having a relative lower strength.

The shielding layer 107 corresponding to a wrinkled tube preferably made of aluminum or lead is provided out of the air-blown installation tube 105. In addition, the corrosion-protective layer 108 made of polyethylene (PE) or the like is provided out of the shielding layer 107 so as to protect inside from mechanical or chemical stress.

In case the shielding layer 107 is not provided, a wire shield 109 (see FIG. 5) for protecting the insulator 102 may be preferably arranged at regular intervals in the same layer as the air-blown installation tube 105.

After the optical fiber composite electric power cable configured as above according to the present invention is installed at an installation position, as shown in FIG. 6, air-blown installation tubes of adjacent cables are connected to each other by means of a tube connector 202 in a cable connection box 200, and then an optical fiber unit for air blown installation is inserted into the tubes by air pressure, then completing the installation work. Here, an optical fiber connection box 201 is not provided to every cable connection box 200, but it may be provided intermittently, for example at every 2 km.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

In the present invention, an optical fiber connection box may not installed in every electric power cable connection box, thereby making the installation work convenient and simplifying the structure of the connection box. In addition, since the number of optical fiber connections is decreased, an optical loss may be reduced.

According to the present invention, an optical fiber unit may be installed through about 2 km region without any optical fiber connection, so time and cost for the installation work may be reduced.

The invention claimed is:

1. A cable structure used for installing an optical fiber composite electric power cable, comprising: a conductor for electric power transmission; an insulator surrounding the conductor; an air-blown installation tube provided outside of the insulator; a corrosion-protective layer provided to an outermost layer of the cable; and tube protecting bodies contacting with both sides of the air-blown installation tube, wherein the tube protecting bodies are made of material having lower strength than the air-blown installation tube.

2. The cable structure according to claim 1,
    wherein the air-blown installation tube is spirally wound along a length direction of the electric power cable.

3. The cable structure according to claim 1,
    wherein the tube protecting bodies are made of paper or plastic.

4. The cable structure according to claim 1, further comprising a wire shield disposed at regular intervals in the same layer as the air-blown installation tube.

* * * * *